(12) United States Patent
Grigorovitch et al.

(10) Patent No.: US 7,941,554 B2
(45) Date of Patent: May 10, 2011

(54) SPARSE CACHING FOR STREAMING MEDIA

(75) Inventors: Alexandre V. Grigorovitch, Redmond, WA (US); Yejin Choi, Bellevue, WA (US); Thales Paulo de Carvalho, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 2095 days.

(21) Appl. No.: 10/632,767

(22) Filed: Aug. 1, 2003

(65) Prior Publication Data

US 2005/0066063 A1    Mar. 24, 2005

(51) Int. Cl.
    *G06F 15/16* (2006.01)
(52) U.S. Cl. ......... 709/231; 709/219; 709/233; 709/247
(58) Field of Classification Search .................... 709/231
    See application file for complete search history.

(56) References Cited

U.S. PATENT DOCUMENTS

| | | | |
|---|---|---|---|
| 5,867,230 A * | 2/1999 | Wang et al. ................. | 348/425.2 |
| 5,946,697 A * | 8/1999 | Shen .............................. | 715/205 |
| 6,347,094 B1 | 2/2002 | Gopalakrishnan | |
| 6,412,004 B1 | 6/2002 | Chen et al. | |
| 6,463,508 B1 | 10/2002 | Wolf et al. | |
| 6,633,918 B2 | 10/2003 | Agarwal et al. | |
| 6,637,031 B1 * | 10/2003 | Chou .............................. | 725/87 |
| 6,665,751 B1 | 12/2003 | Chen et al. | |
| 6,675,174 B1 | 1/2004 | Bolle et al. | |
| 7,028,096 B1 * | 4/2006 | Lee ................. | 709/231 |
| 7,373,413 B1 * | 5/2008 | Nguyen et al. ................ | 709/231 |
| 2002/0103928 A1 * | 8/2002 | Singal et al. .................. | 709/238 |
| 2002/0161911 A1 * | 10/2002 | Pinckney et al. ............. | 709/231 |
| 2002/0169926 A1 | 11/2002 | Pinckney, III et al. | |
| 2002/0170068 A1 | 11/2002 | Rafey et al. | |
| 2003/0099364 A1 * | 5/2003 | Thompson et al. ............. | 381/14 |
| 2005/0026693 A1 * | 2/2005 | Dyl ................................ | 463/42 |

FOREIGN PATENT DOCUMENTS

| | | |
|---|---|---|
| EP | 1298931 A2 | 4/2003 |
| WO | WO0124530 A2 | 4/2001 |
| WO | WO0129670 | 4/2001 |

OTHER PUBLICATIONS

International Search Report dated Feb. 12, 2004 (3 pages).
Birney, "Intelligent Streaming", Inside Window Media, Nov. 19, 1999, XP002177089, pp. 1-2.

* cited by examiner

*Primary Examiner* — Andrew Caldwell
*Assistant Examiner* — Christopher D Biagini
(74) *Attorney, Agent, or Firm* — Lee & Hayes, PLLC

(57) ABSTRACT

Systems, methods, and data structures are described which allow or caching streaming media file in a manner that allows for storage and retrieval of portions of the streaming media file that are temporally non-contiguous and/or encoded at differing bit rates.

21 Claims, 7 Drawing Sheets

SPARSE CACHING FOR STREAMING MEDIA

BACKGROUND

Media streaming is a process for sending an audio/video presentation and other data from streaming media files or from live streaming sources from one location to another over a network, such as the Internet or an intranet. Typically, media streaming involves sending a streaming media file from a server to a client, where the streaming media file may be presented (viewed and/or listened to) using a media player. Media streaming may also be carried out peer-to-peer. Unlike non-streaming media transfer techniques, which require an entire media file to be transferred before it may be presented, media streaming allows presentation of portions of the streaming media file while it is being transmitted or streamed to the client.

Media streaming may be either unicast, where a streaming media file is streamed from a server to a single client, or multi-cast, where the streaming media file is streamed from a server to multiple clients. Additionally, media streaming may be either live, where a streaming media file including data representing a live event is streamed as it occurs, or on-demand, where the streaming media file is stored in a streaming media file and streamed when it is requested. On-demand media streaming is typically unicast, with a separate streaming event occurring between the server and each client.

A basic streaming media file typically includes at least two streams: a video stream and an audio stream. More complex streaming media file will include multiple video and/or audio streams, each stream being encoded at a different bit rate (i.e., multi-bit rate encoding). For example, a given portion or stream of video may be stored in a multiple bit rate encoded streaming media file in six different video streams, each stream being encoded at a different bit rate. When a client requests the streaming media file from the server, a determination is then made as to the bandwidth of the link between the server and the client. One of the six video streams and an audio stream are then selected for transmission to the client, based on predetermined bandwidth criteria. For example, the video and audio streams may be selected such that their combined bit rates are less than a predetermined percentage of the available link bandwidth. If, at some point in the streaming process, the link bandwidth between the server and the client increases or decreases, a different combination of audio and video streams is then selected to meet the predetermined bandwidth criteria. This type of "stream selection" from a multi-bit rate encoded streaming media file based on available bandwidth is commonly referred to as "intelligent streaming."

In some client systems, the streaming experience is enhanced by caching some or all of the received streaming media file at the client prior to playing the streams. Caching the streams prior to playing them reduces the likelihood that a problem in the network connection will interrupt the play of the streaming media file at the client. Furthermore, in some systems, some minimal use of stream navigation (rewinding, replay) may me carried out using the cache.

One problem that currently exists with respect to multi-bit rate encoding and/or media stream caching is that there is no way for streams of varying bit rates or non-temporally adjacent streams to be stored and then accessed in a seamless manner, if at all. Typically, when a switch is made between media streams in a streaming media file due to a change in bandwidth, any previously cached portions of the streaming media file are discarded and a new stream cache is established. Similarly, when a jump is made between temporally non-adjacent locations in a streaming media file such as a seek operation, any previously cached portions of the streaming media file are discarded and a new stream cache is established.

The various systems, methods, and data structures described below address these and other problems.

SUMMARY

Various systems, methods, and data structures are described herein relating to caching streaming media file in a manner that allows for storage and retrieval of portions of the streaming media file that are temporally non-contiguous and/or encoded at differing bit rates.

In accordance with one implementation, a caching mechanism is used that employs unique intermediate storage mechanisms that permit such temporally non-contiguous and/or variously encoded portions of a streaming media file to be stored in, and accessed from, a cache file. In accordance with another implementation, a unique cache file structure is used that permits such temporally non-contiguous and/or variously encoded portions of a streaming media file to be stored in, and accessed from, a common file.

DETAILED DESCRIPTION

Generally, the various systems, methods, and data structures described herein relate to caching a streaming media file in a manner that allows for storage and retrieval of portions of the streaming media that are temporally non-contiguous and/or encoded at differing bit rates. As will be described, a client side caching mechanism uses unique intermediate storage mechanisms and a unique cache file structure that permits such "dissimilar" portions of a streaming media file to be stored in, and accessed from, a cache file.

Exemplary Environment

Figure 1:
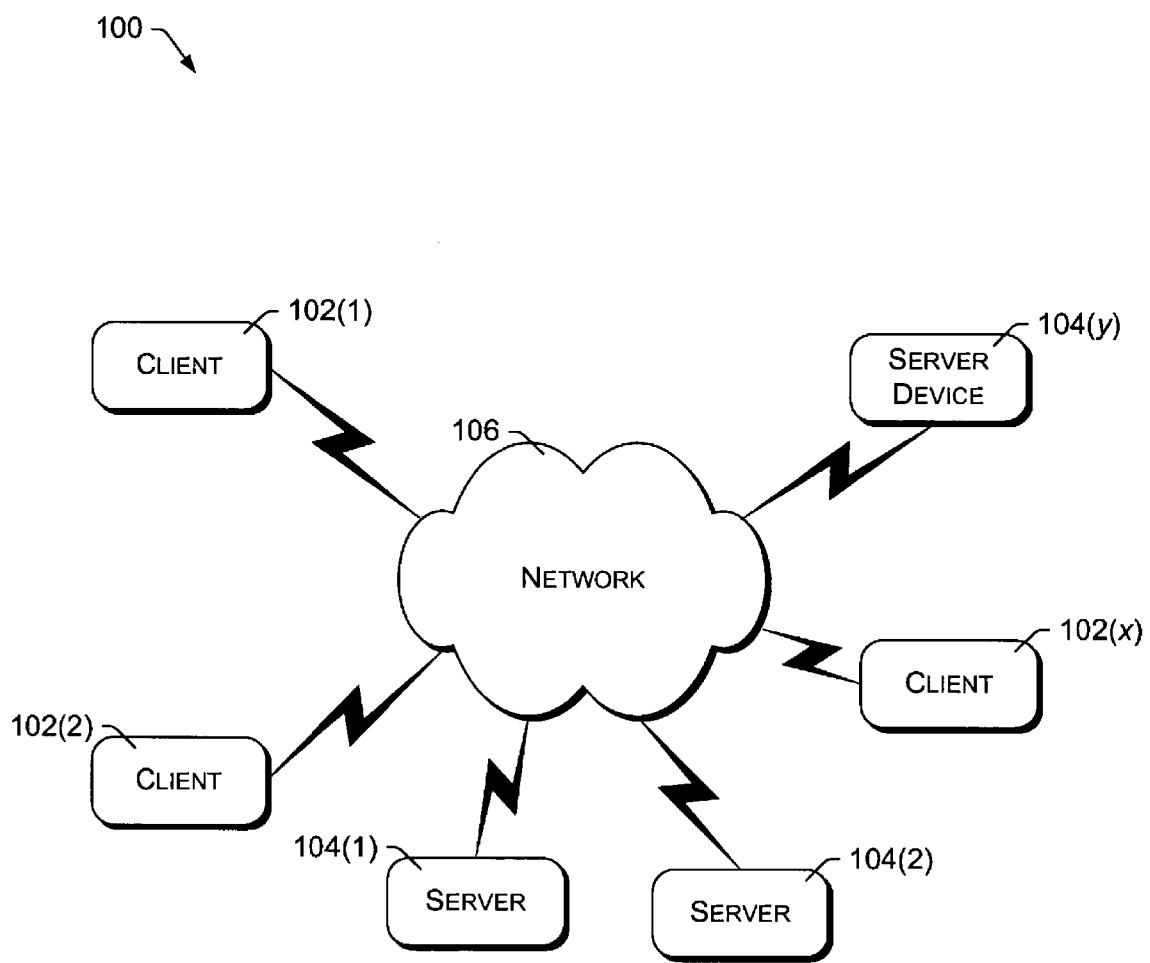
FIG. 1 illustrates an exemplary networking environment in which the various systems, methods, and data structures described herein may me employed.

FIG. 1 illustrates an exemplary network environment 100. In the environment 100, multiple (x) client devices 102(1), 102(2), . . . , 102(x) are coupled to multiple (y) server devices 104(1), 104(2), . . . , 104(y) via a network 106. The network 106 is intended to represent any of a variety of conventional network topologies and types (including wire and/or wireless networks). The network 106 may include, for example, the Internet, an intranet, a Wide Area Network (WAN), a Local Area Network (LAN), and/or various combinations of any of these or other networks.

It is to be appreciated that as used herein, a server device can be any device or process that is a source of a streaming media file, and a client device can be any device or process that receives the streaming media file (e.g., for presentation to a user at the client device). For example, in a peer to peer network, the device or process that is the source of the streaming media file can be referred to as the server device while the device or process that receives the streaming media file can be referred to as the client device.

In accordance with the various embodiments described herein, communication between the client devices 102 and the server devices 104 may occur using any of a variety of conventional communication protocols (including public and/or proprietary protocols). In one implementation, communication between devices 102 and 104 occurs using a version of the Hyper Text Transport Protocol (HTTP). In another implementation, communication between devices 102 and 104 occurs using the Real Time Streaming Protocol (RTSP). Alternatively, other protocols may be used, such as the Session Initiation Protocol (SIP), the Simple Object Access Protocol (SOAP), and so forth.

The devices 102 and 104 may each be any of a variety of conventional computing devices, including desktop PCs, workstations, mainframe computers, Internet appliances, gaming consoles, handheld PCs, cellular telephones, personal digital assistants (PDAs), set-top boxes, etc. One or more of the devices 102 and 104 may be the same types of devices, or alternatively different types of devices.

Although not shown, one or more additional devices (e.g., firewalls, routers, gateways, bridges, multiple proxy servers, etc.) may be situated between a client device 102 and a server device 104. It should be noted that multiple client devices 102 may access a single server device 104 and that a single client device 102 may access multiple server devices 146.

Figure 2:
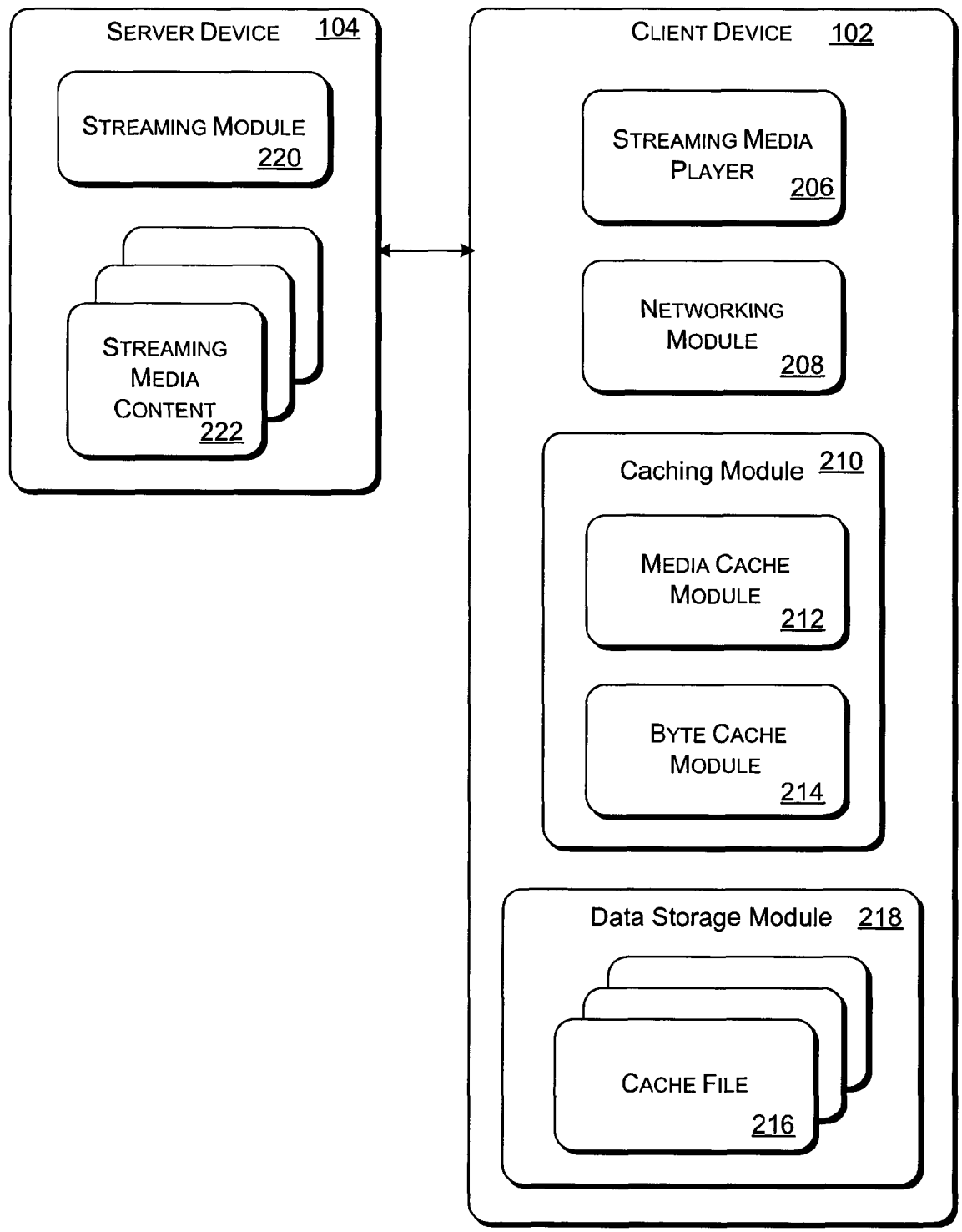
FIG. 2 illustrates exemplary client and server devices.

FIG. 2 illustrates an exemplary server device 104. As shown, the server device 104 includes a streaming module 216 and one or more streaming media files 222. The server device 104 may be, for example, an origin server device 104 of FIG. 1, or alternatively another device (e.g., a proxy device). In general, the streaming module 220 functions to receive a request for a streaming media file, or a portion of a streaming media file, such as from the client device 102, and to stream the streaming media file 222 or a portion of the file to the requester.

A "media file" includes one or more digital streams of information that may be rendered by a media player. Typically, the media file will include two or more streams that are temporally synchronized. The media file may also include other streams which are independent. The contents of a media file may or may not be compressed. The term "streaming media file" is used herein to indicate that a media file is provided over a network to a client device and that playback of the media file can begin prior to the media file being delivered in its entirety (e.g., providing the media file data on an as-needed basis rather than pre-delivering the data in its entirety before playback). A streaming media file may be publicly available or alternatively restricted (e.g., restricted to only certain users, available only if the appropriate fee is paid, etc.). A streaming media file can be any of a variety of one or more types of time-based media file, wherein information within the streaming media file specifies the temporal presentation of some or all of the file during playback, such as audio, video, temporal text presentation, animation, etc. Additionally, the streaming media file may be pre-recorded or alternatively "live" (e.g., a digital representation of a concert being captured as the concert is performed and made available for streaming shortly after capture).

A streaming media file 222 may be stored and/or streamed in accordance with any of a variety of different streaming media file formats. For example, a streaming media file may be stored as a static streaming media file. Alternatively, a streaming media file 222 may be streamed "live" from one or more streaming media sources or producers. In one exemplary implementation, media files are stored and/or streamed in accordance with the ASF format (Advanced Systems Format or Advanced Streaming Format). Additional information regarding ASF is available from Microsoft® Corporation of Redmond, Wash. The same technique can be applied to other formats as well, such as MPEG (Moving Pictures Experts Group)-1, MPEG-2, MPEG-4, Quicktime, etc.

As shown, the client device 102 includes a streaming media player 206, a networking module 208, a caching module 210, and one or more cache files 216. Included in the caching module 210 are a media cache module 212 and a byte cache module 214. As shown, the one or more cache files are stored in a data storage module 218 at the client device 102.

Generally, the streaming media player 206 provides a means by which a streaming media file 222 may be selected by a user for presented at the client device 102. In accordance with one embodiment, the streaming media player 206 is an application or applet that is executed by a processor on the client device 102. The streaming media player 206 is operable to receive and decode streaming media files and to deliver the content of the streaming media files to appropriate video and audio output devices at the client device 102.

In general, the networking module 208 functions as type a "gateway" between the streaming media player 206 and various sources of streaming media files. In this capacity, the networking module 208 performs a number of functions related to establishing connections between the streaming media player 206 and the various streaming media sources. For example, in accordance with one embodiment, the networking module 208 establishes a network connection between the streaming media player 206 and the server device 104. The networking module 208 also establishes a network connection between the streaming media player 206 and the caching module 210.

In addition, the networking module 208 performs a number of functions related to determining from which of a number of available streaming media sources the streaming media player 206 will receive data. For example, in accordance with one embodiment, in response to receiving a request from the streaming media player 206 for all or part of a particular streaming media presentation, the networking module 208 determines whether the request can be satisfied by retrieving the requested data from a previously stored cache file 216, or whether the requested data needs to be retrieved from a server device.

In accordance with one embodiment, the networking module 208 determines the streaming rate of the streaming media file between the streaming module 220 and the networking module 208 based on a variety of different factors. This can be determined in any of a variety of conventional manners, such as sending test messages between devices 102 and 104, monitoring current and past behavior of connections between devices 102 and 104, receiving an indication of the available bandwidth from streaming module 220, and so forth. Given the current available bandwidth, the networking module 208 initially requests a streaming rate that is a particular amount less than the current available bandwidth. This particular amount can be fixed (e.g., always 50 kbps) or dynamic (e.g., 15% of the current available bandwidth, or between 5% and 25% of the current available bandwidth).

In accordance with one embodiment, the networking module 208 creates or instantiates the media cache module 212, described below. In accordance with this embodiment, the networking module may create or instantiate a single networking module or multiple networking modules. Other functions that may be performed by the networking module 208 include, without limitation, determining if a cache file related to a particular streaming media presentation is stored in the data storage module and creating cache files in the data storage module. Conventional components that are part of client device 102 may optionally be used to assist the networking module 208. For example, in one exemplary implementation, the Microsoft® Internet Explorer browser program includes cache management functionality such as monitoring the expiration of items in the cache and/or garbage collection, and the networking module 208 may use this functionality in performing the various operations of the networking module outlined above.

In accordance with one embodiment, the data storage module 218 is composed of nonvolatile memory. For example, and without limitation, the data storage module 218 may be composed of one or more nonvolatile memory devices, such as magnetic or optical storage devices, magneto optical storage devices, nonvolatile RAM, or other type of nonvolatile storage devices. In accordance with another embodiment, the data storage module 218 is composed of one or more types of volatile memory devices.

The caching module 210 provides a mechanism by which a streaming media file may be written to and read from a cache file 216 in the data storage module 218. As shown, the caching module 210 includes a media cache module 212 and a byte cache module 214. As described in greater detail below, the media cache module 212 and the byte cache module 214 each create and/or manage in one or more intermediate data structures into which various portions and arrangements of received streaming media data are stored.

The media cache module 212 provides intermediate data structures for a received streaming media file. In particular, the media cache module 212 creates in one or more computer-readable media five types of data structures, a media cache stream, a media cache segment, a media cache header segment, a byte cache index segment, and a byte cache data segment. In operation, the media cache module 212 creates a single media cache header segment and a number of media cache streams and media cache segments for each media file that is received.

The media cache module 212 creates and manages a media cache stream for each different type and encoded bit rate of stream received in a streaming media file by the client device 102. As used herein, a "type" of stream refers to the format or function (e.g. audio or video) of the stream. As will be appreciated, the encoded bit rate of a stream is the bit rate at which the stream was original stored in the streaming media file. As such, if the media cache module 212 receives three video streams from a streaming media file, each having a different bit rate, and two audio streams, each having a different bit rate, the media cache module 212 will produce five different media cache streams. In operation, the media cache module 212 will create a new media cache stream each time a new type or bit rate of media stream is received by the media cache module 212.

When a stream is received by the media cache module 212, the data within the received stream is stored in a media cache segment within (i.e., logically associated with) a media cache stream of the same type and bit rate as the received stream. For example, if a video stream encoded at a bit rate of X is received by the media cache module 212, the data from the received stream will be stored in a media cache stream of the type "video," having an associated bit rate of X. If a media cache stream of the type "video" encoded at bit rate X has not yet been created, the media cache module 212 will create such a media cache stream. Once the media cache module 212 has created a media cache stream for a given type and bite rate of a received stream, the media cache module 212 will create a separate media cache segment for each temporally non-contiguous portion of the received stream. As used herein, the term "temporally non-contiguous" refers to portions of a received stream or streaming media file that are not adjacent to one another in terms of the temporal presentation of their content during playback. As such, the media cache module 212 will create a separate media cache segment in a given media cache stream for each portion of the received stream that is not immediately adjacent in time, relative to time structure of the received stream, to another media cache stream in the given media cache stream.

Figure 3:
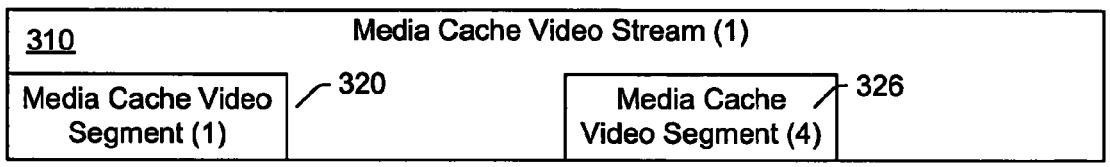
FIG. 3 illustrates an exemplary arrangement and format of media streaming data.
Figure 3:
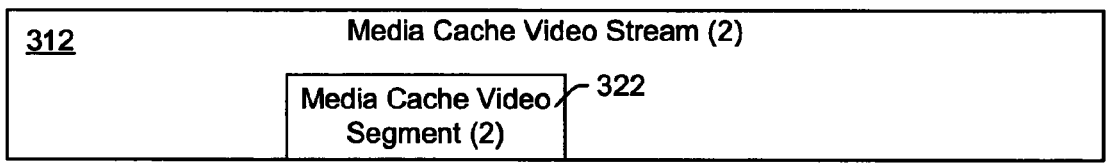
Figure 3:
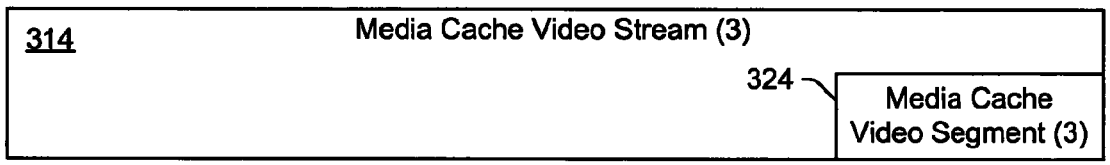
Figure 3:
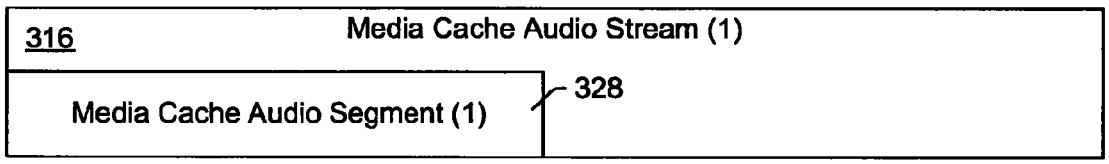
Figure 3:
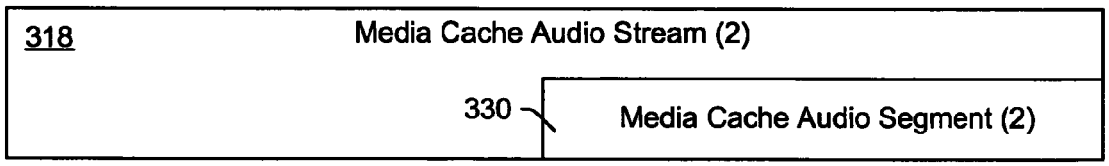

FIG. 3 illustrates a graphical representation 300 of an arrangement of media cache streams and media cache segments created by the media cache module 212 for a hypothetical streaming media file. The media cache streams and segment are shown as being aligned vertically with respect to a time axis 340, where the time axis indicates the playing time of the streaming media file.

As shown, the media cache module 212 has created three separate media cache video streams: media cache video stream (1) 310, media cache video stream (2) 312, and media cache video stream (3) 314, each of which is associated with a different bit rate. Additionally, the media cache module 212 has created two separate media cache audio streams: media cache audio stream (1) 316, and media cache audio stream (2) 318, each of which is associated with a different bit rate.

As shown, the media cache module 212 has created: two temporally non-contiguous media cache video segments 320 and 326 within media cache video stream (1) 310; one media cache video segment 322 within media cache video stream (2) 312; and one media cache video segment 324 within media cache video stream (3). Additionally, the media cache module 212 has created: one media cache audio segment 328 within media cache audio stream (1) 316; and one media cache segment 330 within media cache audio stream (2).

As noted, the media cache module 212 also creates, for each received streaming media file, a media cache header segment data structure. The media cache header segment includes a file identifier field, a media cache segment count field, one or more media cache segment information fields, and/or a streaming media file description.

In accordance with one embodiment, the file identifier field includes a Globally Unique Identifier (GUID) that identifies the cache file into which the data of each of the media cache streams and segments for a given streaming media file are stored. The media cache segment count field stores a number indicating the total number of media cache segments having data stored in the cache file. Each media cache segment information field stores a media cache segment information data structure for each media cache segment having data stored in the cache file.

The media cache segment information data structure includes fields containing some or all of the following information about a single media cache segment having data in the cache file: an identifier of the media cache segment; a stream identifier that specifies the media cache stream that includes the media cache segment; a segment start position indicator that indicates the start of the media cache segment in the media cache stream that includes the media cache segment; a segment end position identifier that indicates the end of the media cache segment in the media cache stream that includes the media cache segment; a stream size indicator that specifies the size of the media cache stream including the media cache segment; a previous segment identifier that specifies a media cache segment, if any, immediately preceding the media cache segment in the media cache stream; a next segment identifier that specifies a media cache segment, if any, immediately succeeding the media cache segment in the media cache stream, and a segment data type identifier that specifies the type of data (e.g. audio, video, etc.) included in the media cache segment.

The information included in the streaming media file description is dependent on the format of the streaming media file. However, generally, the streaming media file description may include such information as descriptions of the various streams of the media file, a description of the codec used to generate the content of the media file, and/or other meta data related to the content.

In operation, the media cache module 212 creates a byte cache index segment and an associated byte cache data segment for each media cache segment created by the media cache module. In accordance with one embodiment, each byte cache data segment includes, without limitation, the presentable data (e.g., audio or video data, etc.) of the media cache segment from which it is created. In accordance with one embodiment, each byte cache index includes, without limitation, the following information related to the data in its associated byte cache data segment; a start time, a duration time, an offset to the data in the byte cache data segment, and/or the size of the data.

In accordance with one embodiment, the media cache module 212 creates or instantiates the byte cache module 214, described below. In accordance with this embodiment, the media cache module 212 may create or instantiate a single byte cache module 214 or multiple byte cache modules.

Figure 4:
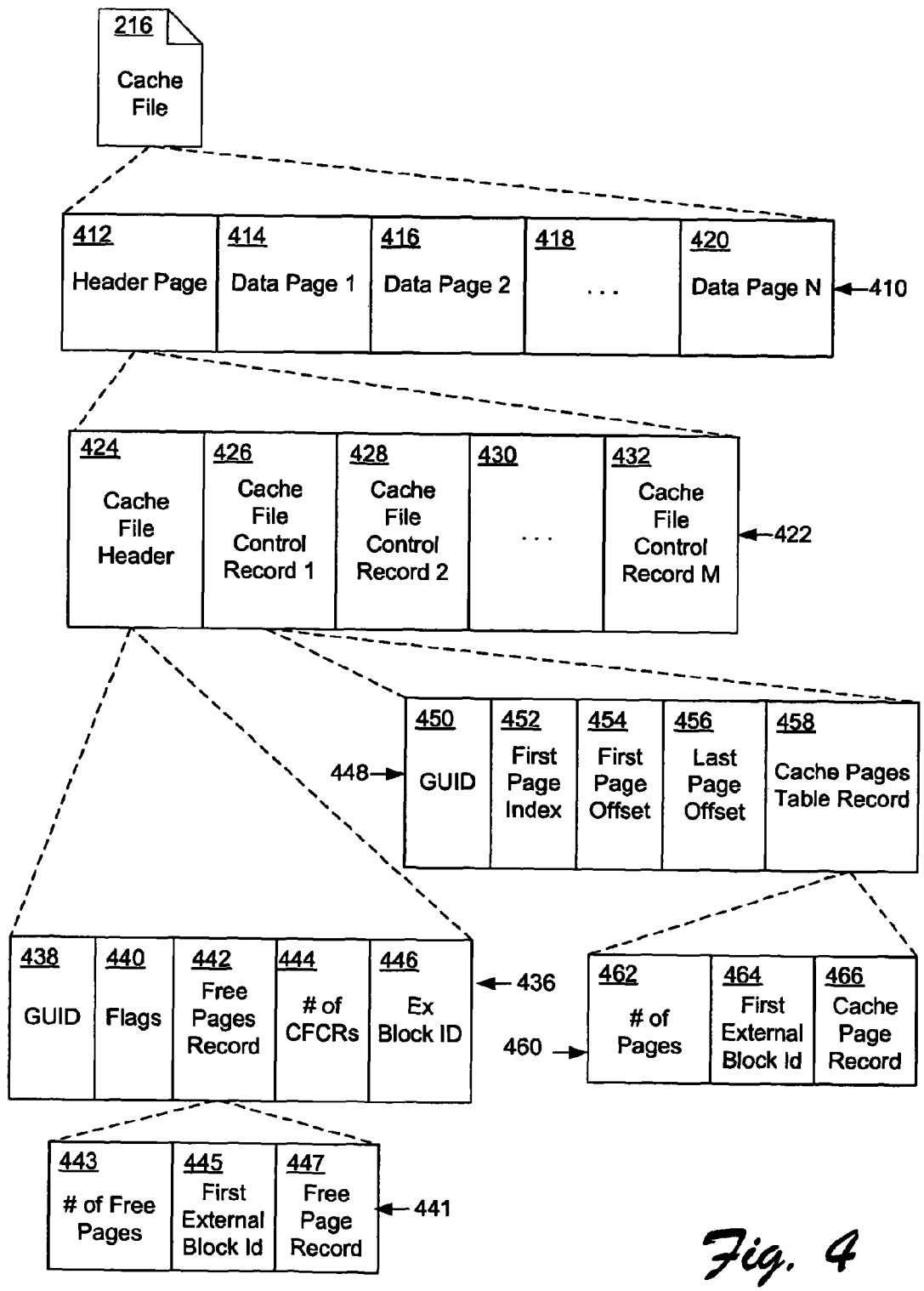
FIG. 4 illustrates an exemplary data structure of a cache file.

The byte cache module 214 serves to, among other things, serialize and store the data from the byte cache index segments and a byte cache data segments in the cache file 216, in accordance with a predetermined cache file data structure format. FIG. 4 illustrates one such exemplary cache file data structure format for the cache file 216. As shown, the cache file 216 is composed of a number of pages 410. Included in these pages are a header page 412 and a number of data pages 414-420. In general, the data pages 414-420 includes the byte cache index and data segments created by the media cache module 212, while the header page 412 includes information that describes one or more characteristics of the data pages.

As shown in FIG. 4, the header page 412 includes a number of header page data fields 422. Included in the header page data fields 422 are a cache file header data field 424 and a number of cache file control record data fields 426-432. The cache file header data field 424 further includes a number of cache header fields 436. Included in the cache header fields 436 are a cache header GUID field 438, a flags field 440, a free pages record 442, a number of CFCRs data field 444, and an external block ID field 446. The cache header GUID field 438 includes a globally unique identifier that uniquely identifies the cache file 216. The flags field 440 includes an indicator flag that specifies whether the cache file includes valid data.

The number of CFCRs data field 444 includes an identifier that specifies the number of cache file control records included in the header page data fields 422. The external block ID field 446 includes a pointer to a page in the cache file that includes additional cache file control records. The external block ID field 446 is used in the instance where the number of cache file records required in the cache file is grater than the number of cache file control records that may be included in the header page 412.

The free pages record 442 includes a number of table record data fields 441, including a number of free pages data field 443, a first external block ID field 445, and a free page record field 447. The number of free pages data field 443 includes an identifier indicating the number of free pages in the cache file. The free page record field 447 includes a table particularly identifying the various free data pages in the cache file. In the case where the number of free data pages exceeds the number of free data pages that can be specified in the free page record field 447, the first external block ID includes a pointer to a page that includes a data structure identifying additional free data pages.

Each of the cache file control records 426-432 is associated with a single byte cache segment. In general, each of the cache file control records 426-432 includes information defining the position of its associated byte cache in the cache file 216. As shown in FIG. 4, each cache file control record includes a number of CFCR data fields 448. Included in the CFCR data fields 448 are a CFCR GUID field 450, a first page index field 452, a first page offset field 454, a last page offset field 456, and a cache pages table record 458. Each of the CFCR data fields 448, and the information contained therein, may be said to be associated with the single byte cache segment associated with the cache file control record to which they belong.

The GUID field 450 includes a globally unique identifier that uniquely identifies the cache file control record in which it is included. In general, the first page index field 452, the first page offset field 454, and the last page offset field 456, include addresses defining a window or range of addresses in which the data from the byte cache segment is stored.

In accordance with one embodiment, the first page index field 452 includes an address of the first page in the data pages including its associated byte cache segment. The first page offset field 454 includes a pointer to location in a page, relative to the start of the page indicated by the first page index field 452, of the beginning of the data of its associated byte cache segment. The last page offset field 456 includes a pointer to location in a page, relative to the start of the page indicated by the first page index field 452, of the end of the data of its associated byte cache segment.

The cache pages table record 458 includes a number of table record data fields 460, including a number of pages data field 462, a first external block ID 464, and a cache page record 466. The number of pages data field 462 includes an identifier indicating the number of data pages that contain data from its associated byte cache segment. The cache page record field 466 includes a table identifying the various data pages that include data from its associated byte cache segment. In the case where the number of data pages including data from its associated byte cache segment exceeds the number of data pages that can be specified in the cache page record field 466, the first external block ID field 464 includes a pointer to a page that includes a data structure identifying additional data pages that include data from its associated byte cache segment.

Figure 5:
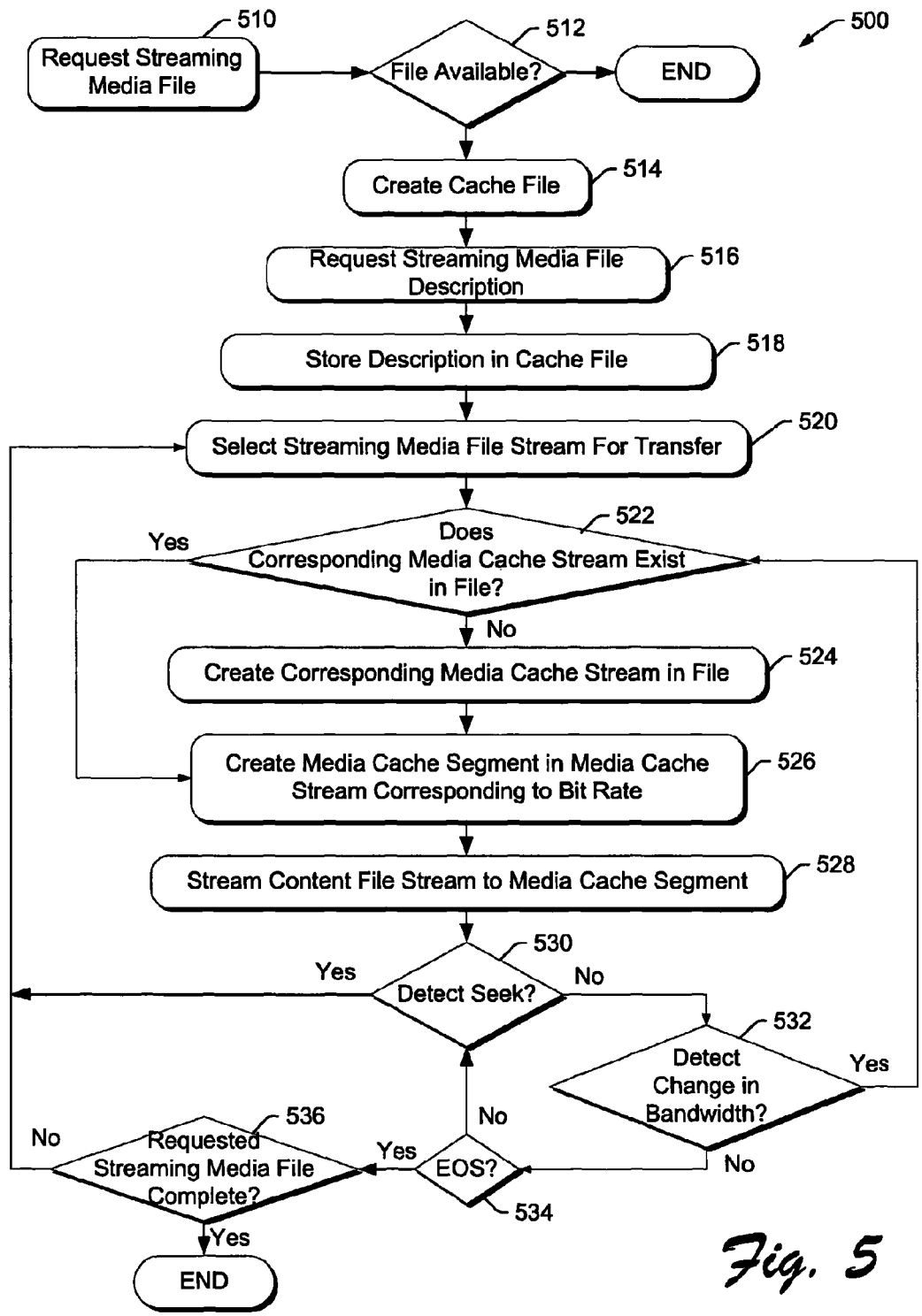
FIG. 5 illustrates an exemplary operational flow including various acts for recording streaming media.

FIG. 5 illustrates an exemplary operational flow including various operations 500 for receiving and storing a streaming media file. In accordance with one embodiment, the operational flow is implemented by a client device, such as client device 102 of FIG. 2, and may be performed in software, firmware, hardware, or combinations thereof.

As shown in FIG. 5, at the start of the operational flow 500 a request is made 510 for all or part of a specified streaming media file. For example, in accordance with one embodiment, a request is made to a server device, such as server device 104 of FIG. 2, for a particular streaming media file. Following the request 510, a determination operation 512 determines whether the requested streaming media file is available. If it is determined that the requested streaming media file is not available, the operational flow 500 ends. If, however, it is determined that the requested streaming media file is available, a create cache file operation 514 then creates a cache file for storage of the requested streaming media file. In accordance with one embodiment, the create cache file operation 514 creates the cache file in a data storage module, such as data storage module 218 of FIG. 2.

Following the creation of the cache file a request description operation 516 requests a description of the streaming media file from the server device. A store description operation 518 then receives and stores the streaming media file description in the created cache file. Next, a select streaming media file stream operation 520 selects a media stream from the server device for transfer to the client device. In accordance with one embodiment, the select streaming media file stream operation 520 selects the stream for transfer based at least in part on the bandwidth currently available between the client device and the server device. A stream determination operation 522 then determines if corresponding media cache stream exists in the cache file for the selected stream. That is, the stream determination operation 522 determines whether a media cache stream having the same type and bit rate as the selected stream is present in the cache file.

If it is determined that a corresponding media cache stream does not exists in the cache file for the selected stream, a create media cache stream operation 524 then creates a corresponding media cache stream in the cache file. Following the creation of the corresponding media cache stream, a create media cache segment operation 526 creates a media cache segment in the media cache stream created in operation 524 corresponding to the selected stream. Returning to the determination operation 522, if it is determined therein that a corresponding cache stream already exists in the cache file for the selected stream, the operational flow bypasses the create streaming media cache stream operation 524, and proceeds to the create media cache segment operation 526, where a media cache segment is created in the corresponding media cache stream. Following the create media segment operation, a streaming operation 528 then streams data from the selected stream into the created media cache segment.

As data from the selected stream is being stream into the created media segment cache, a detect seek operation 530 determines whether a seek operation is being requested. If it is determined that a seek operation is being requested, the operational flow proceeds back to the select streaming media file stream operation 520. If it is determined that a seek operation is not being requested, the operational flow proceeds to a detect change in bandwidth operation 532, which determines whether the bandwidth between the client device and the server device has changed since the select streaming media file stream operation 520 was performed. If it is determined that a change in the bandwidth has occurred, the operational flow returns to the stream determination operation 522. If it is determined that a change in the bandwidth has not occurred, the operational flow proceeds to an end of stream determination operation, where it is determined whether the end of the selected stream in the select streaming media file stream operation 520 has been reached. If it is determined that the end of the selected stream has not been reached, the operational flow 500 proceeds back to the detect seek operation 530. If it is determined that the end of the stream selected has been reached the operational flow 500 proceeds to an requested media file complete determination operation 536, where it is determined whether the media file requested at 510 has been completely stored to the cache file. In accordance with one embodiment, the requested media file will be determined to be complete if all desired streams have been completely downloaded at an acceptable bit rate. If it is determined that the media file requested has not been completely stored to the cache file, the operational flow 500 returns to the selected streaming media file stream operation 520. If however is determined that the media file requested has been completely stored to the cache file, the operational flow 500 ends.

Figure 6:
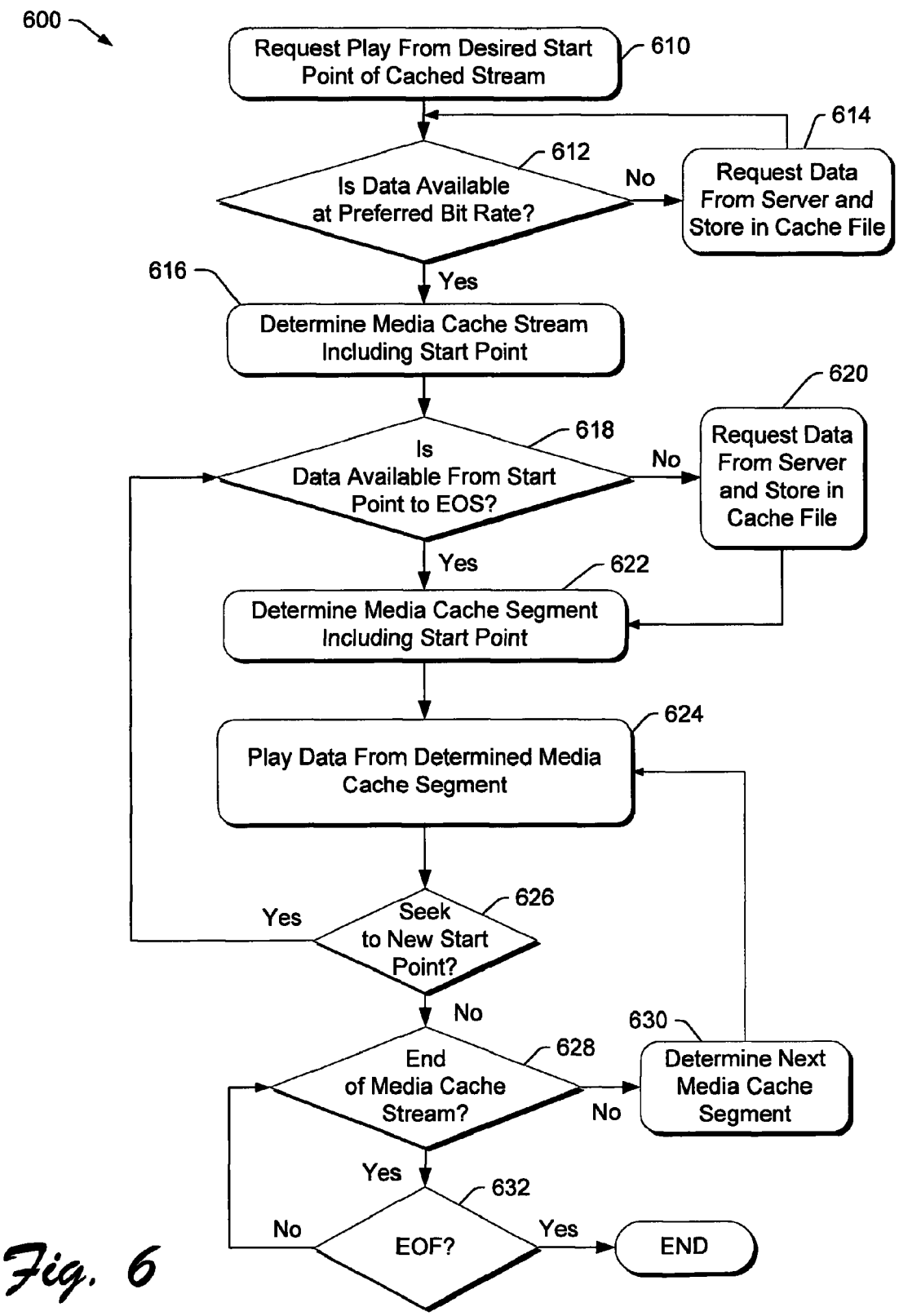
FIG. 6 illustrates an exemplary operational flow including various acts for playing streaming media.

FIG. 6 illustrates an exemplary operational flow 600 including various operations 600 for retrieving and presenting streaming media. The operational flow 600 includes operation for selectively retrieving a single stream, such as a single video or audio stream, from a cache file, such as cache file 216. It should be appreciated that multiple streams from a streaming media file and/or cache file may be retrieved in accordance with the operational flow 600. In accordance with one embodiment, the operational flow 600 is implemented by a client device, such as client device 102 of FIG. 2, and may be performed in software, firmware, hardware, or combinations thereof.

As shown in FIG. 6, at the start of the operational flow 600, a request is received from a data requester (e.g. the media player) to play data from a desired point in a particular type of stream. For example, a request may be received to start playing a video stream from a particular a particular point in time with respect to a particular streaming media file stored in a server. However, rather than going directly to the server to service the request, a preferred bit rate operation 612 determines if the requested data is available in the cache file at a preferred bit rate. The preferred bit rate may be set or determined in a number of ways. For example, and without limitation, in accordance with one embodiment, a packet-pair technique is used to determine the preferred bit rate. In accordance with another embodiment, a user may explicitly specify the preferred bit rate.

If the requested data is not available in the cache file at the preferred bit rate, a server request operation 614 then requests the requested data from the server and stores the requested data in the cache file. Following the server request operation 614, the operational flow returns to the preferred bit rate operation 612. In accordance with one embodiment, after a number of unsuccessful attempts are made to get the requested data from the server, a determination is made as to whether the requested data is available in the cache file at bit rate lower than the preferred bit rate. If so, the requested data at the lower bit rate may be accessed from the cache file.

Next, a start point determination operation 616 determines which media cache stream in the cache file includes the start point of the requested data. A data available operation 618 then determines if the requested data is available from the start point to the end of the stream. Stated another way, the data available operation 618 determines if there are any temporal discontinuities in the data in the stream from the start point to the end of the stream. If it is determined that the data is available from the start point to the end of the stream, the operational flow proceeds to a determine cache segment operation 622, which determines the media cache segment in the determined media cache stream that includes the start point. If, however, it is determined that the data is not available from the start point to the end of the stream, the operational flow proceeds to a server data request operation 620, which requests from the server any data that is needed to complete the stream, such that there are no temporal discontinuities from the start point to the end of the stream. The operational flow 600 then proceeds to the determine cache segment operation 622. It should be understood that the operational flow continues on after the request has been made to the server by the server data request operation 620. That is, the operational flow is not suspended until the data requested in operation 620 is received from the server and stored.

Following the determine cache segment operation 622, a play operation 624 delivers the data from the determined media cache segment to the data requester for play. While the determined media cache segment is being delivered to the data requester, a seek determination operation 626 determines if a seek has been requested to a new start point in the determined media cache stream. This may occur, for example, when a seek operation is performed by the data requester to another temporal location in the determined media cache stream. If the seek determination operation 626 determines that a seek has been requested, the operational flow 600 returns to the data available operation 618. If, however, the seek determination operation 626 determines that a seek has not been requested, and after the data from the determined media cache segment has been completely delivered to the data requester, a cache stream end determination operation 628 determines whether the end of the determined media cache stream has been reached. If it is determined that the end of the determined media cache stream has not been reached, a next cache segment operation 630 determines the next media cache segment in the determined media cache stream that is to be accessed. If, however, it is determined that the end of the determined media cache stream has been reached, the operational flow 600 proceeds to an end of file (EOF) determination operation 632, where it is determined if the end of the cache file has been reached. If it is determined that the end of the cache file has not been reached, the operational flow 600 returns to the cache stream end determination operation 628. If, however, it is determined that the end of the cache file has been reached, the operational flow 600 ends.

Various operational flows have been illustrated in FIGS. 5 and 6. It should be noted that the operations illustrated in figures can be performed in the order shown, or alternatively in different orders.

Figure 7:
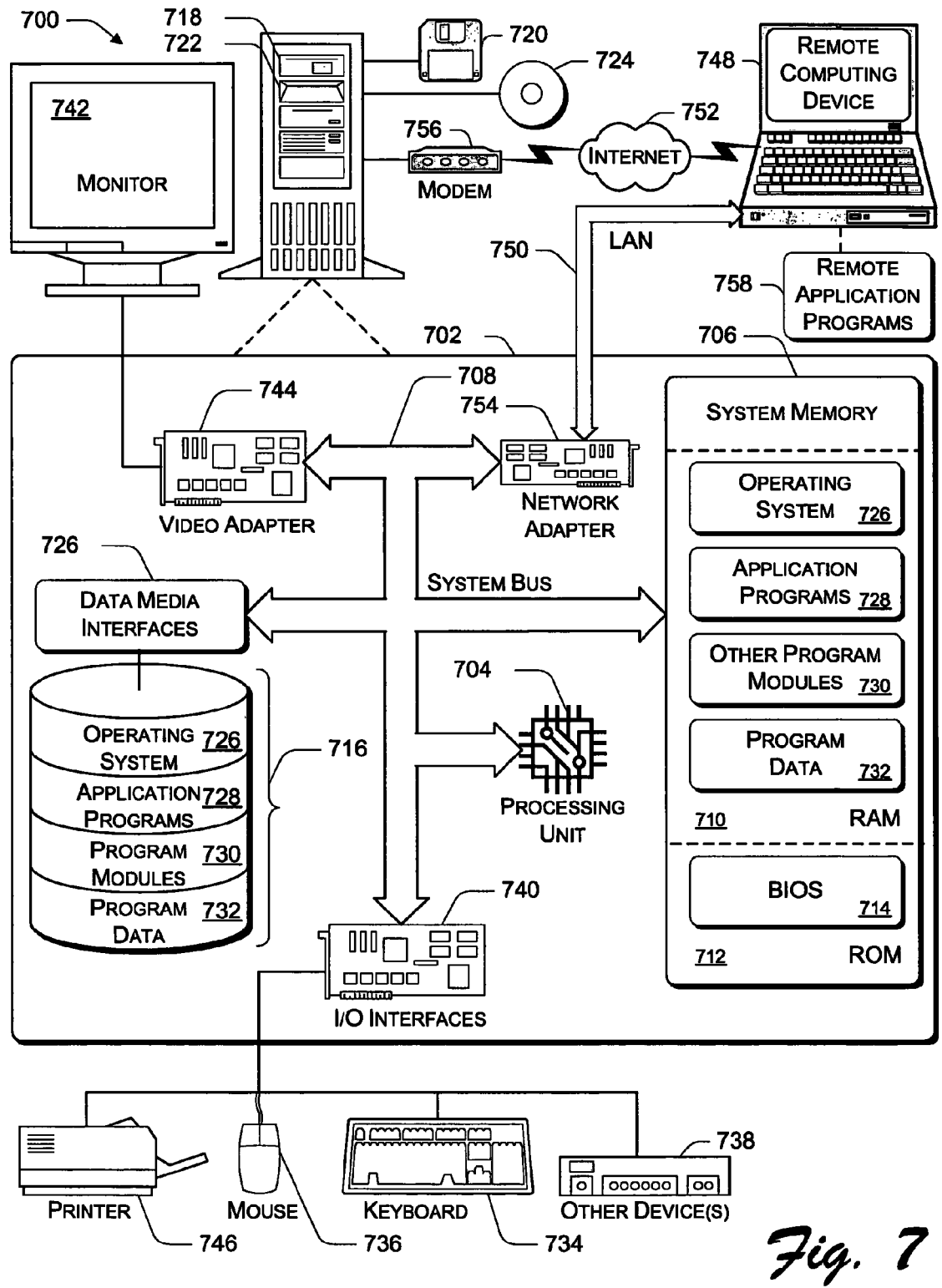
FIG. 7 illustrates an exemplary general computer environment, which can be used to implement the systems, methods, and data structures described herein.

FIG. 7 illustrates a general computer environment 700, which can be used to implement the techniques described herein. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the exemplary computer environment 700.

The computer environment 700 includes a general-purpose computing device in the form of a computer 702. The computer 702 may be, for example, a client device 102 or server device 104 of FIG. 1 or 2. The components of the computer 702 may include, but are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 702 typically includes a variety of computer-readable media. Such media can be any available media that is accessible by the computer 702 and includes both volatile and non-volatile media, removable and non-removable media.

The system memory 706 includes computer-readable media in the form of volatile memory, such as random access memory (RAM) 710, and/or non-volatile memory, such as read only memory (ROM) 712. A basic input/output system (BIOS) 714, containing the basic routines that help to transfer information between elements within the computer 702, such as during start-up, is stored in ROM 712. RAM 710 typically contains data and/or program modules that are immediately accessible to and/or presently operated on by the processing unit 704.

The computer 702 may also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by one or more interfaces (not shown).

The disk drives and their associated computer-readable media provide non-volatile storage of computer-readable instructions, data structures, program modules, and other data for computer 702. Although the example illustrates a hard disk 716, a removable magnetic disk 720, and a removable optical disk 724, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

A number of program modules may be stored on the hard disk 716, magnetic disk 720, optical disk 724, ROM 712, and/or RAM 710, including by way of example, an operating system 726, one or more application programs 728, other program modules 730, and program data 732.

A user can enter commands and information into the computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

The computer 702 may operate in a networked environment using logical connections to one or more remote computers, such as a remote computing device 748. By way of example, the remote computing device 748 may be a personal computer, portable computer, a server, a router, a network computer, a peer device or other common network node, and the like. The remote computing device 748 is illustrated as a portable computer, and may include many or all of the elements and features described herein relative to computer 702.

Logical connections between the computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 may be connected to a local network 750 via a network interface or adapter 754. When implemented in a WAN networking environment, the computer 702 may include a modem 756 or other means for establishing communications over the wide network 752. The modem 756, which may be internal or external to computer 702, may be connected to the system bus 708 via the input/output interfaces 740 or other appropriate mechanisms. It is to be appreciated that the illustrated network connections are exemplary and that other means of establishing communication link(s) between the computers 702 and 748 may be employed.

In a networked environment, such as that illustrated with the computing environment 700, program modules depicted relative to the computer 702, or portions thereof, may be stored in a remote memory storage device. By way of example, remote application programs 758 reside on a memory device of remote computer 748. For purposes of illustration, application programs and other executable program components such as the operating system are illustrated herein as discrete blocks, although it is recognized that such programs and components may reside at various times in different storage components of the computing device 702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Although the description above uses language that is specific to structural features and/or methodological acts, it is to be understood that the systems and methods defined in the appended claims are not limited to the specific features or acts described. Rather, the specific features and acts are disclosed as exemplary forms of implementing the invention.

The invention claimed is:

1. A method comprising:
   receiving, at a client device for presentation to a user, a plurality of temporally non-contiguous portions of a streaming media file, wherein:
   temporally non-contiguous portions consist of portions of a received streaming media file that are not adjacent to one another in terms of temporal presentation of content of the non-contiguous portions during playback, and
   at least a first and a second of the temporally non-contiguous portions of the received streaming media file are encoded at different bit rates, wherein the first and second non-contiguous portions comprise video data and wherein a third non-contiguous portion comprises audio data; and
   storing the plurality of temporally non-contiguous portions of the received streaming media file in a single cache file on the client device, wherein the act of storing comprises:
   creating, at the client device, a plurality of media cache streams, each media cache stream being associated with a unique bit rate;
   storing the first non-contiguous portion in a media cache stream associated with the bit rate of the first non-contiguous portion;
   storing the second non-contiguous portion in a media cache stream associated with the bit rate of the second non-contiguous portion; and
   storing, by the client device, the media cache streams in the cache file.

2. A method as defined in claim 1, wherein the first and second non-contiguous portions comprise video data.

3. A method as defined in claim 1, wherein the cache file is stored in non-volatile memory.

4. A method as defined in claim 1, wherein the act of storing comprises:
   creating a first media cache stream associated with the bit rate of the first non-contiguous portion;
   storing the first non-contiguous portion in a media cache segment of the first media segment stream;
   creating a second media cache stream associated with the bit rate of the second non-contiguous portion;
   storing the second non-contiguous portion in a media cache segment of the second media cache stream;
   creating a byte cache index segment and a byte cache data segment for each media cache segment; and
   storing the byte cache index segments and the byte cache data segments in the cache file.

5. A method comprising:
   creating, at a client device, a plurality of media cache streams, each media cache stream being associated with a unique bit rate;

receiving, at the client device for presentation to a user, a plurality of temporally non-contiguous portions of a streaming media file, two or more of the temporally non-contiguous portions being encoded at different bit rates, wherein:
  temporally non-contiguous portions consist of portions of a received streaming media file that are not adjacent to one another in terms of temporal presentation of content of the non-contiguous portions during playback, and
  each temporally non-contiguous portion is associated with a unique temporal section of the streaming media file;
storing each temporally non-contiguous portion in a media cache segment of a media cache stream associated with a bit rate at which the temporally non-contiguous portion was encoded, at least two of the temporally non-contiguous portions being stored in media cache segments in different media cache streams; and
storing, by the client device, each of the media cache streams in a single cache file.

6. A method as defined in claim 5, wherein the act of storing comprises:
  creating a byte cache index segment and a byte cache data segment for each media cache segment; and
  storing the byte cache index segments and the byte cache data segments in the cache file.

7. A method as defined in claim 5, wherein the act of storing comprises:
  creating a byte cache index segment and a byte cache data segment for each segment; and
  serializing the byte cache index segments and the byte cache data segments in the cache file.

8. A method as defined in claim 5, wherein the cache file is stored in a non-volatile manner.

9. A system comprising:
  a client device comprising:
    a processor;
    a data storage module;
    a caching module operable to receive and store a plurality of temporally non-contiguous portions of a streaming media file for presentation to a user, the streaming media file including different data types, in a cache file in the data storage module, two or more of the plurality of temporally non-contiguous portions being encoded at different bit rates, wherein:
    the caching module comprises processor executable code; and
    the caching module is operable to:
      create a plurality of media cache streams, each media cache stream being associated with a streamed media data type and a streamed media encoded bit rate;
      store each temporally non-contiguous portion of received streamed media data as a media cache segment in a media cache stream associated with the streamed media data type and a streamed media encoded bit rate of the temporally non-contiguous portion;
      parse each media cache segment into a byte cache index segment and a byte cache data segment; and
      store the byte cache index segments and the byte cache data segments in the cache file.

10. A system as defined in claim 9, wherein the data storage module comprises a non-volatile data storage device.

11. A system as defined in claim 9, wherein the caching module comprises:
  a media cache module operable:
    to store each of the plurality of temporally non-contiguous portions as the media cache segment in one of the plurality of media cache streams; and
    parse each media cache segment into the byte cache index segment and the byte cache data segment.

12. A system as defined in claim 9, wherein the caching module comprises:
  a media cache module operable to:
    store each of the plurality of temporally non-contiguous portions as the media cache segment in one of a plurality of media cache streams, each media cache stream being associated with a different bit rate; and
    parse each media cache segment into the byte cache index segment and the byte cache data segment; and
  a byte cache module operable to store the byte cache index segments and the byte cache data segments in the cache file.

13. A system as defined in claim 9, wherein the caching module comprises:
  a media cache module operable to:
    create the plurality of media cache streams, each media cache stream being associated with a unique bit rate; and
    store each temporally non-contiguous portion as the media cache segment in the media cache stream associated with the bite rate at which the temporally non-contiguous portion was encoded; and
    parse each media cache segment into the byte cache index segment and the byte cache data segment; and
  a byte cache module operable to:
    store the byte cache index segments and the byte cache data segments in the cache file.

14. A system as defined in claim 9, wherein the two or more of the plurality of temporally non-contiguous portions include a first video portion encoded at a first bit rate, a second video portion encoded at a second bit rate, and an audio portion, and wherein the first video portion, the second video portion, and the audio portion are stored in different media cache streams.

15. A system as defined in claim 9, wherein:
  the streaming media file includes different data types; and
  the caching module is operable to:
    store the media cache streams in the cache file.

16. A system as defined in claim 9, wherein the caching module is operable to:
  store each of the plurality of temporally non-contiguous portions as the media cache segment in one of the plurality of media cache streams; and
  create a segment/stream map specifying the media cache segment and stream in which each temporally non-contiguous portion is stored.

17. A computer-readable storage medium, wherein the medium is not a signal, having computer-executable instructions for performing acts comprising:
  storing, at a client for presentation to a user, a plurality of temporally non-contiguous portions of a streaming media file received from a streaming media source in a cache file, each of the plurality of temporally non-contiguous portions being encoded at a different bit rate, wherein the act of storing comprises:
  creating, at the client device, a plurality of media cache streams, each media cache stream being associated with a unique bit rate;
  receiving a first video portion of the streaming media file encoded at a first bit rate;

storing the first video portion in a media cache video stream associated with the first bit rate;
receiving a second video portion of the streaming media file encoded at a second bit rate;
storing the second video portion in a media cache video stream associated with the second bit rate;
receiving a third video portion of the streaming media file encoded at a first bit rate, the a third video portion being temporally non-contiguous from the first video portion;
storing the third video portion in the media cache video stream associated with the first bit rate;
receiving a first audio portion of the streaming media file;
storing the first audio portion in a media cache audio stream; and
storing the audio and video media cache streams in the cache file.

18. A computer-readable storage medium as defined in claim 17, wherein the act of storing comprises:
storing each of the temporally non-contiguous portions in a unique media cache segment;
forming at least two byte cache segments from each media cache segment; and
storing the byte cache segments in the cache file.

19. A computer-readable storage medium as defined in claim 17, wherein the act of storing comprises:
storing each of the temporally non-contiguous portions in at least two byte cache segments; and
storing the byte cache segments in the cache file.

20. A system comprising:
a client device comprising a processor and a memory, the memory storing code comprising:
code for receiving a plurality of temporally non-contiguous portions of a streaming media file for presentation to a user, wherein temporally non-contiguous portions consist of portions of a received streaming media file that are not adjacent to one another in terms of temporal presentation of content of the non-contiguous portions during playback, and at least two of the plurality of temporally non-contiguous portions of the streaming media file are encoded at a different bit rate, wherein the first and second non-contiguous portions comprise video data and wherein a third non-contiguous portion comprises audio data; and
code for associating and storing the plurality of temporally non-contiguous portions of the streaming media file in a data structure of a single cache file, wherein the act of storing comprises:
creating a plurality of media cache streams, each media cache stream being associated with a unique bit rate;
storing the first non-contiguous portion in a media cache stream associated with the bit rate of the first non-contiguous portion;
storing the second non-contiguous portion in a media cache stream associated with the bit rate of the second non-contiguous portion; and
storing the media cache streams in the cache file at the client device.

21. A method comprising:
receiving, at a client device for presentation to a user, a plurality of first portions of a streaming media file from a remote server device via a network connection, wherein the plurality of the first portions of the streaming media file is encoded at a first bit rate and is selected for transmitting to the client device based on a currently available bandwidth of the network connection between the client device and the remote server device;
storing the plurality of the first portions of the received streaming media file on the client device, wherein the storing comprises:
creating, at the client device, a first media cache stream being associated with the first bit rate; and
storing the plurality of the first portions of the received streaming media file in the first media cache stream associated with the first bit rate of the first portion;
detecting, at the client device, that a change in the bandwidth occurs in the network connection between the client device and the remote server device;
receiving, based on the changed bandwidth of the network connection, a plurality of second portions of the streaming media file from the remote server device via the network connection, wherein the plurality of the second portions of the streaming media file is encoded at a second bit rate different from the first bit rate and is selected for transmitting to the client device based on the changed bandwidth of the network connection between the client device and the remote server device;
storing the plurality of the second portions of the received streaming media file on the client device, wherein the act of storing comprises:
creating, at the client device, a second media cache stream being associated with the second bit rate; and
storing the plurality of the second portions of the received streaming media file in the second media cache stream associated with the second bit rate of the second portion; and
storing the first media cache stream and the second media cache stream in a single cache file at the client device, wherein the single cache file comprises data identifying the first media cache stream and the second media cache stream in the single cache file.

* * * * *